US008161466B2

(12) United States Patent
Jeong

(10) Patent No.: US 8,161,466 B2
(45) Date of Patent: Apr. 17, 2012

(54) METHOD OF PRE-PROCESSING CONDITIONAL REGION

(75) Inventor: Soon-Yong Jeong, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1183 days.

(21) Appl. No.: 11/942,991

(22) Filed: Nov. 20, 2007

(65) Prior Publication Data

US 2008/0141228 A1   Jun. 12, 2008

(30) Foreign Application Priority Data

Nov. 20, 2006  (KR) .................. 10-2006-0114771

(51) Int. Cl.
*G06F 9/45* (2006.01)
(52) U.S. Cl. .................. 717/140; 717/136; 717/142
(58) Field of Classification Search .................. None
See application file for complete search history.

(56) References Cited

U.S. PATENT DOCUMENTS

| | | | | |
|---|---|---|---|---|
| 5,276,880 A * | 1/1994 | Platoff et al. | .................. | 717/143 |
| 5,692,196 A * | 11/1997 | Unni et al. | .................... | 717/145 |
| 5,701,487 A * | 12/1997 | Arbouzov | ..................... | 717/124 |
| 5,715,463 A * | 2/1998 | Merkin | .......................... | 717/175 |
| 5,764,974 A * | 6/1998 | Walster et al. | .................. | 706/18 |
| 5,946,488 A * | 8/1999 | Tanguay et al. | ................. | 717/141 |
| 6,138,271 A * | 10/2000 | Keeley | ........................... | 717/140 |
| 6,560,776 B1 * | 5/2003 | Breggin et al. | ................ | 717/176 |
| 6,574,792 B1 * | 6/2003 | Easton | ........................... | 717/142 |
| 6,684,389 B1 * | 1/2004 | Tanaka et al. | .................. | 717/140 |
| 6,986,129 B2 * | 1/2006 | Arbouzov et al. | ............. | 717/146 |
| 7,543,281 B2 * | 6/2009 | King et al. | ..................... | 717/140 |
| 7,624,385 B2 * | 11/2009 | Waddington et al. | .......... | 717/143 |
| 7,689,975 B2 * | 3/2010 | Popp | .............................. | 717/136 |
| 7,861,236 B2 * | 12/2010 | Grebenev | ....................... | 717/142 |
| 2002/0178438 A1 * | 11/2002 | Arbouzov et al. | ............. | 717/148 |
| 2004/0226004 A1 * | 11/2004 | Oldman | ......................... | 717/136 |
| 2005/0081104 A1 * | 4/2005 | Nikolik | ........................... | 714/38 |
| 2006/0225052 A1 * | 10/2006 | Waddington et al. | .......... | 717/136 |
| 2008/0028373 A1 * | 1/2008 | Yang et al. | ..................... | 717/140 |
| 2010/0037212 A1 * | 2/2010 | Meijer et al. | .................... | 717/142 |

FOREIGN PATENT DOCUMENTS

WO   WO 9607137 A1 * 3/1996

OTHER PUBLICATIONS

Booth, N., Cpplib Internals [online], 2005 [retrieved Dec. 13, 2011], Retrieved from Internet: <http://gcc.gnu.org/onlinedocs/cppinternals.pdf>, whole document.*

(Continued)

*Primary Examiner* — Thuy Dao
*Assistant Examiner* — Todd Aguilera
(74) *Attorney, Agent, or Firm* — The Farrell Law Firm, P.C.

(57) ABSTRACT

Provided is a method of pre-processing a conditional region. By analyzing and designating code lines according to the present invention, when a conditional region included in a pre-processing region of an arbitrary file is compiled, the compiling can be efficiently performed, and when the arbitrary file is executed, an execution result can be derived in a short time.

3 Claims, 8 Drawing Sheets

OTHER PUBLICATIONS

Badros, G., "PCp3: A C Front End for Preprocessor analysis and Transformation" [online], 1997 [retrieved Dec. 13, 2011], Retrieved from Internet: <http://citeseerx.ist.psu.edu/viewdoc/versions?doi=10.1.1.56.6523>, pp. 1-26.*

Stallman, R., et al., CPP Library: directives.c [online], 2005 [retrieved Dec. 13, 2011], Retrieved from Internet: <https://www.codeblog.org/gonzui/markup/gcc-4.0.2/libcpp/directives.c>, pp.*

Garrido, A., et al., Analyzing Multiple Configurations of a C Program, Proceedings of the 21st IEEE International Conference on Software Maintenance [online], 2005 [retrieved May 6, 2011], Retrieved from Internet: <http://www.lifia.info.unlp.edu.ar/papers/2005/Ralph2005.pdf>, pp. 1-11.*

Stallman, R., et al., The C Preprocessor [online], 2005 [retrieved, May 6, 2011], Retrieved from Internet: <http://linux.skjelbred.com/manuals/gcc.gnu.org/onlinedocs/gcc-4.1.2/cpp.pdf>, entire document.*

* cited by examiner

```
# define  A = 10         ······· 101
# if A == 10             ······· 103
   printf ("A = 10")     ······· 105
# else                   ······· 107
   printf ("A = Another value") ··· 109
# endif                  ······· 111
```

```
IfBlock{
  ifLine;      // START LINE OF CONDITIONAL BLOCK(#if/#ifdef/#ifndef)
  elseLine;    // LINE LATELY SCANNED AMONG LINES OF CONDITIONAL
                  BLOCK INCLUDING #else/#elif
  passTo;      // END LINE OF CONDITIONAL BLOCK(#endif)
  condition;   // STATE VARIABLE INDICATING STATE OF CONDITIONAL
                  EXPRESSION
}
```
~401

```
PrepLine{
  tokenList
  falseTo      // LINE MOVED WHEN CONDITIONAL EXPRESSION
                  ACCOMPANYING #if/#ifdef/#ifndef/#elif IS 'FALSE'
  passTo       // END LINE OF CONDITIONAL BLOCK(#endif)
}
```
~403

FIG.4

```
while (line = ReadAndTokenizeLine()) != NULL ················601
    prepCommand = {pre-processing command of current line} ···603
    if prepCommand == "#if" or "#ifdef" or "#ifndef" ··········605
        IfStack.Push(new IfBlock(line, NULL)) ················607
        IfStack.Top().ifLine = line ·························609
    else if not IfStask.Empty(): ·····························611
        if prepCommand == "else" or "elif" ··················613
            if IfStask.Top().elseLine == NULL: ···············615
                IfStask.Top().ifLine.falseTo = line ·············617
            else
                IfStask.Top().elseLine.falseTo = line ···········619
            IfStask.Top().elseLine = line ···················621
        else if prepCommand = "endif" ·····················623
            IfStask.Top().ifLine.passTo = line ················625
            if IfStask.Top().elseLine == NULL ···············627
                IfStask.Top().ifLine.falseTo = line ·············629
            else
                IfStask.Top().elseLine.falseTo = line ···········631
IfStask.Pop() ·······················································633
```

FIG.6

```
while (line = File.GetNextLine()) != NULL ....................801
    if (prepCommand = {Conditional block prep. command of line}) ...803
        if prepCommand == "#if" or "#ifdef" or "#ifndef" ...........805
            condition = EvaluateCondition(line) ...................807
            IfStask.Push(new IfBlock(line.PassTo, condition)) .........809
            if condition == False ...............................811
                File.MoveLine(line.falseTo) .....................813
        else if prepCommand == "#endif" ..........................815
            IfStack.Pop() .......................................817
        else ...................................................819
            if IfStack.Top().condition == True ..................821
                File.MoveLine(IfStack.Top().PassTo) .............823
            else if prepCommand == "#elif" ......................825
                IfStack.Top().condition = EvaluateCondition(line) ...827
                if IfStack.Top().condition == False .............829
                    File.MoveLine(line.falseTo) .................831
            else ...............................................833
                IfStack.Top().condition = True ..................835
    else .......................................................837
        ProcessLine(line) ......................................839
```

FIG.8

```
# define  A = 10              ······· 901
# if A == 10                  ······· 903
    printf ("A = 10")         ······· 905
# else                        ······· 907
    printf ("A = Another value") ···· 909
# endif                       ······· 911
```

FIG.9

METHOD OF PRE-PROCESSING CONDITIONAL REGION

PRIORITY

This application claims the benefit under 35 U.S.C. §119 (a) of a Patent Application filed in the Korean Intellectual Property Office on Nov. 20, 2006 and assigned Serial No. 2006-114771, the contents of which are hereby incorporated by reference.

BACKGROUND OF THE INVENTION

1. Field of the Invention

The present invention relates generally to a process of compiling an arbitrary file, and in particular, to a method of pre-processing a conditional region during compiling of an arbitrary file.

2. Description of the Related Art

Compiling is a process of transforming a file in a programming language to a file in a machine language. Most program languages support a pre-processing region, which must first be processed during the compiling. The pre-processing region includes macro functions used to increase a user's ability to read or manage multi-version sources, a file insertion command, conditional commands, and the like. For example, the C or C++ languages may provide #define and #undef commands related to a macro function, a #include command related to file insertion, and conditional commands such as a #if syntax, a #ifdef syntax, a #ifndef syntax, a #else syntax, and a #endif command.

If any of the commands described above are included in a pre-processing region when compiling, a terminal having a compiler performs the functions of the command.

A process of compiling conditional commands in a pre-processing region will now be described with reference to FIG. 1. When a compiler of a terminal compiles the file illustrated in FIG. 1, the compiler generates a token list by performing a line scanning process and a tokenizing process on a line-by-line basis from line 101 to line 111. However, when a compiled file is executed, executed lines differ according to whether a conditional syntax of a conditional command is 'true' or 'false'. That is, the terminal executes the #define command contained in line 101, which is a command related to a macro function, so that A=10. The terminal moves to line 103 and executes the #if syntax, which is a conditional command. Since the #if syntax is true, the terminal moves to line 105, executes the printf syntax, and moves to line 107. Since the #if syntax is true, the terminal does not execute the #else syntax contained in line 107 or the printf syntax contained in line 109. The terminal executes the #endif command contained in line 111 and ends the execution.

As described above, when the file illustrated in FIG. 1 is compiled, even though the token list is generated by performing the line scanning process and the tokenizing process with respect to all lines, when the compiled file is executed, only lines 103, 105, and 111 are executed among the lines in a conditional region.

Thus, when a conditional region included in a pre-processing region of a file is compiled, a compiled file is generated by containing lines which will not be executed, resulting in inefficiency of compile. In addition, when the compiled file generated by means of the inefficient compile is executed, it takes a relatively long time to derive an execution result.

SUMMARY OF THE INVENTION

It is therefore an aspect of the present invention to substantially solve at least the above problems and/or disadvantages and to provide at least the advantages below. Accordingly, an aspect of the present invention is to provide a method of efficiently compiling a conditional region included in a pre-processing region of a file.

Another aspect of the present invention is to provide a method of reducing the time to derive an execution result when a file is executed.

According to one aspect of the present invention, there is provided a method of pre-processing a conditional region, the method includes (a) when compiling is requested, analyzing codes included in an arbitrary file, searching a conditional region in a pre-processing region, and designating and storing line information according to a conditional command included in the conditional region; (b) generating a token list by tokenizing the codes and storing the generated token list; (c) sequentially detecting an arbitrary code from the token list; (d) determining if the detected code is a conditional command, and if it is determined that the detected code is a conditional command, searching line information according to a conditional state of a conditional expression accompanying a previous conditional command and a conditional state of a conditional expression accompanying a current conditional command; and (e) detecting a relevant code from the token list according to the line information, and repeating the search process.

BRIEF DESCRIPTION OF THE DRAWINGS

The above and other objects, features and advantages of the present invention will become more apparent from the following detailed description when taken in conjunction with the accompanying drawing in which:

FIG. 4 illustrates pseudo-codes defining a data structure for recording conditional region information according to an exemplary embodiment of the present invention;

FIG. 6 illustrates pseudo-codes obtained by editing a line scanning process in a programming language according to an exemplary embodiment of the present invention;

FIG. 8 illustrates pseudo-codes obtained by editing a token processing process in a programming language according to an exemplary embodiment of the present invention; and FIG. 9 illustrates a file using pre-processing commands according to an exemplary embodiment of the present invention.

DETAILED DESCRIPTION OF THE PREFERRED EMBODIMENT

Preferred embodiments of the present invention will be described herein below with reference to the accompanying drawings. In the following description, well-known functions or constructions are not described in detail since they would obscure the invention in unnecessary detail.

Figures 1, 2:
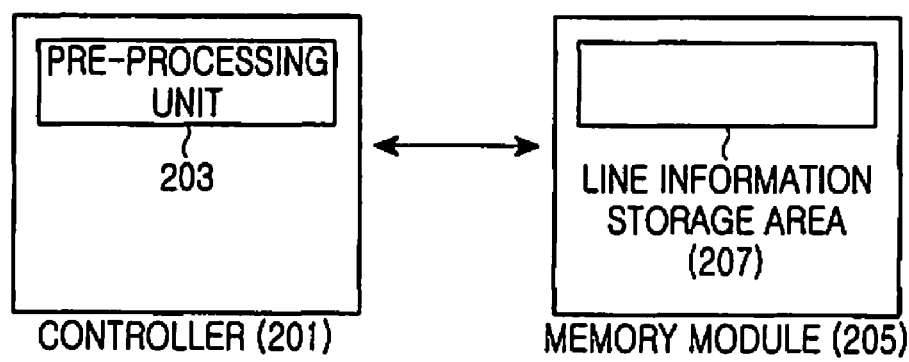
FIG. 1 illustrates a file using pre-processing commands.
FIG. 2 is a regional configuration of a terminal according to an exemplary embodiment of the present invention.

FIG. 2 is a regional configuration of a terminal according to an exemplary embodiment of the present invention.

Referring to FIG. 2, the terminal having a compiler includes a controller 201, a pre-processing unit 203, and a memory module 205. The compiler transforms a file edited in a high-level language to a file edited in a machine language, which can be executed in the terminal.

When the compiling of an arbitrary file is requested by a user, the compiler module 203 of the controller 201 generates a token list by searching for the file from the memory module 205, analyzing codes of the file, and performing a line scanning process and a tokenizing process. The compiler module 203 performs token processing by receiving codes in the order of the token list and creates a compiled file.

The line scanning process is a process of scanning the codes of the arbitrary file on a line-by-line basis. The compiler module 203 searches a conditional region included in a pre-processing region by line-scanning the codes of the arbitrary file, analyzes pre-processing line information from the searched conditional region, and stores the analysis result in a line information storage area 207 of the memory module 205. The pre-processing line information contains 'ifLine', which is a start line of the conditional region, 'passTo', which is an end line of the conditional region, and 'falseTo', which is a line performed when a conditional expression is 'false'.

For example, when the line scanning process is performed using a file edited in the C or C++ languages, the compiler module 203 detects codes by analyzing the arbitrary file, analyzes each detected code, and determines whether the detected code is a conditional command. If a current conditional command is a #if syntax, a #ifdef syntax, or a #ifndef syntax, the compiler module 203 stores a current line as 'ifLine', which is a start line of the conditional region.

If the current conditional command is a #else syntax or a #elif syntax, the compiler module 203 determines whether the current #else or #elif syntaxes are a first #else or #elif syntax. If it is determined that the current #else or #elif syntaxes are the first #else or #elif syntax, the compiler module 203 stores the current line as 'falseTo', which is a line performed when a conditional expression accompanying the #if syntax, the #ifdef syntax, or the #ifndef syntax is 'false'. If it is determined that the current #else or #elif syntaxes are not the first #else or #elif syntax, the compiler module 203 stores the current line as 'falseTo', which is a line performed when a conditional expression accompanying a previous #elif syntax, which is a conditional command, is 'false'.

If the current conditional command is a #endif syntax, the compiler module 203 stores the current line as 'passTo', which is an end line of the conditional region. If a previous conditional command is a #if syntax, a #ifdef syntax, or a #ifndef syntax, the compiler module 203 stores the current line as 'falseTo', which is a line performed when a conditional expression accompanying the #if syntax, the #ifdef syntax, or the #ifndef syntax is 'false'. If the previous conditional command is a #elif syntax, the compiler module 203 stores the current line as 'falseTo', which is a line performed when a conditional expression accompanying the #elif syntax is 'false'.

The tokenizing process is a process of generating a token list by dividing codes of an arbitrary file obtained by scanning the codes on a line-by-line basis into character streams. The compiler module 203 can perform the tokenizing process by receiving the line-scanned codes on a line-by-line basis or receiving all of the line-scanned codes of the arbitrary file.

In the current embodiment, it is assumed that the token list is generated by performing the tokenizing process by receiving the line-scanned codes on a line-by-line basis.

The token processing is a process of performing compiling so as to contain lines associated with a conditional command according to whether a conditional expression accompanying the conditional command is 'true' or 'false', or to not contain the lines associated with the conditional command. When the token processing is performed, the compiler module 203 uses the pre-processing line information stored in the line scanning process.

For example, when the token processing is performed using a file edited in the C or C++ languages, the compiler module 203 receives an arbitrary code according to the token list and determines whether the arbitrary code is a conditional command.

If the determined conditional command is a #if syntax, a #ifdef syntax, or a #ifndef syntax, the compiler module 203 determines whether a conditional expression accompanying the #if syntax, the #ifdef syntax, or the #ifndef syntax is 'true' or 'false'. If a current conditional expression is 'true', the compiler module 203 performs compiling by receiving arbitrary codes from the token list to contain lines below the current conditional expression until a next conditional expression is received. If the current conditional expression is 'false', the compiler module 203 searches for 'falseTo', which is a line in which the next conditional expression is located, from the line information storage area 207. The compiler module 203 receives a code corresponding to the found 'falseTo' line from the token list and determines whether the received code is a conditional command. The above procedures are then repeated.

If the determined conditional command is a #elif syntax, the compiler module 203 determines whether a conditional expression accompanying a previous conditional command is 'true' or 'false'. If the previous conditional expression is 'true', the compiler module 203 searches for 'passTo', which is an end line the conditional region stored in the line information storage area 207. The compiler module 203 searches for a code contained in the found 'passTo' line from the token list, receives the found code, and determines whether or not the found code is a conditional command. The above procedures are then repeated. If the previous conditional expression is 'false', the compiler module 203 performs compiling by receiving arbitrary codes from the token list to contain lines below a current #else syntax until a next conditional expression is received.

If the determined conditional command is the #elif syntax, the compiler module 203 determines whether a conditional expression accompanying a previous conditional command associated with the current #elif syntax is 'true' or 'false'. If the previous conditional expression is 'true', the compiler module 203 searches for 'passTo', which is an end line the conditional region stored in the line information storage area 207. The compiler module 203 searches for a code contained in the found 'passTo' line from the token list, receives the found code, and determines if the found code is a conditional command. The above procedures are then repeated. If the previous conditional expression is 'false', the compiler module 203 determines whether a conditional expression accompanying the current #elif syntax is 'true' or 'false'. If it is determined that the conditional expression accompanying the current #elif syntax is 'true', the compiler module 203 performs compile by receiving arbitrary codes from the token list to contain lines below a current #else syntax until a next conditional expression is received. If it is determined that the conditional expression accompanying the current #elif syntax is 'false', the compiler module 203 searches for 'falseTo', which is a line in which the next conditional expression is located, from the line information storage area 207. The compiler module 203 searches for a code contained in the found 'falseTo' line from the token list, receives the found code, and determines whether the found code is a conditional command. The above procedures are then repeated.

The memory module 205 stores data required when the terminal having a compiler is controlled. In particular, when an arbitrary file in the line information storage area 207 is pre-processed, the memory module 205 stores 'ifLine', which is a start line of a conditional region registered in the line scanning process, and 'passTo', which is an end line of the conditional region. The memory module 205 also stores at least one 'falseTo', which is a line performed when a conditional expression in the conditional region is 'false'. The memory module 205 also stores a compiled file created by token-processing a tokenized arbitrary file.

Figure 3:
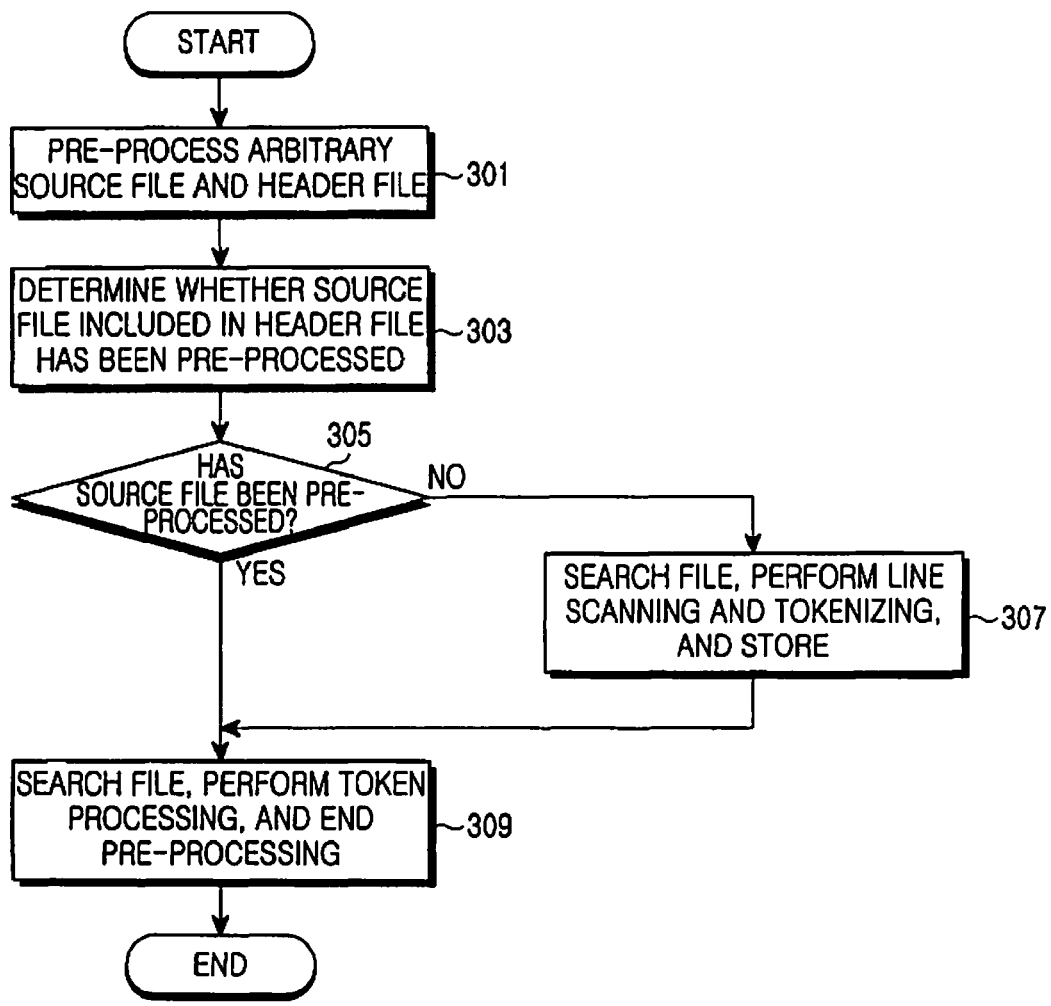
FIG. 3 is a flowchart illustrating a method of pre-processing a conditional region according to an exemplary embodiment of the present invention.

FIG. 3 is a flowchart illustrating a method of pre-processing a conditional region according to an exemplary embodiment of the present invention.

In the present invention, the header file comprises at least one of source file. As an example it is assumed that both a header file and a source file contain a pre-processing region including a conditional region. In the example it is also assumed that the terminal stores the header file and the source file in the memory module 205.

In the current embodiment, a data structure for registering information on the conditional region and line information of the conditional region is required. A structure of the conditional region and a line structure of the conditional region will now be described with reference to FIG. 4. Architectures 401 and 403 illustrated in FIG. 4 consist of pseudo-codes for implementing the embodiment illustrated in FIG. 3.

The architecture 401 indicates the structure of the conditional region. The architecture 401 includes 'ifLine', 'elseLine', 'passTo', and 'condition' data. The 'ifLine' data indicates a start line of the conditional region. For example, when an arbitrary file created in the C or C++ languages is line-scanned, if a conditional command contained in a current line is a #if syntax, a #ifdef syntax, or a #ifndef syntax, the controller 210 can store the current line as 'ifLine'.

The 'elseLine' data indicates a #else syntax or a #elif syntax of a recently line-scanned conditional region. For example, when an arbitrary file created in the C or C++ languages is line-scanned, if a conditional command contained in a current line is a #else syntax or a #elif syntax, the controller 210 can store the current line as 'elseLine'.

The 'passTo' data indicates an end line of a conditional region. For example, when an arbitrary file created in the C or C++ languages is line-scanned, if a conditional command contained in a current line is a #endif syntax, the controller 210 can store the current line as a 'passTo' line.

The 'condition' data is a state variable, and if a currently line-scanned conditional command is a #if syntax, a #ifdef syntax, a #ifndef syntax, or a #endif syntax, the 'condition' data indicates a state of a conditional expression contained in a current line. For example, when an arbitrary file created in the C or C++ languages is token-processed, if a conditional command contained in a current line is a #if syntax, the controller 210 determines whether a conditional expression below the #if syntax is 'true' or 'false', and can store the determination result in 'condition'.

The architecture 403 indicates the line structure of the conditional region. The architecture 403 includes 'tokenList', 'falseTo' and 'passTo' data.

The 'tokenList' data is generated by an arbitrary file performing the line scanning process and the tokenizing process and indicates a list of codes obtained by tokenizing the arbitrary file. When the token processing is performed, the compiler module 203 receives an arbitrary code according to 'tokenList' and token-processes the arbitrary code.

The 'falseTo' data indicates a line performed when a state of a conditional expression is 'false' in a case where a conditional command is contained in a current line and the conditional command has the conditional expression. For example, when an arbitrary file created in the C or C++ languages is line-scanned, if a conditional region consists of a #if syntax, a #else syntax, and a #endif syntax, the controller 210 cannot determine, in the line scanning process, whether a conditional expression accompanying the #if syntax is 'true' or 'false', but can store a line containing the #else syntax as 'falseTo', which is a line performed when the #if syntax is 'false'. Thereafter, the controller 210 determines in the token processing whether the conditional expression accompanying the #if syntax is 'true' or 'false'. If the conditional expression is 'false', the controller 210 searches for a code contained in the 'falseTo' line from the token list, receives the found code, and continues the token processing.

The 'passTo' data indicates an end line of a conditional region. For example, when an arbitrary file created in the C or C++ languages is token-processed, if a conditional region consists of a #if syntax, a #else syntax, and a #endif syntax, the controller 210 determines whether a conditional expression accompanying the #if syntax is 'true' or 'false'. If the conditional expression is 'true', the controller 210 searches lines below the #if syntax until the #else syntax is found. If a line containing the #else syntax is found, the controller 210 searches for a code corresponding to a line below the #else syntax from the token list to immediately move to a line registered in 'passTo', receives the found code, and continues the token processing.

If compiling of an arbitrary source file and a header file is requested in step 301 of FIG. 3, the controller 201 proceeds to step 303.

When at least one source file included in the header file is pre-processed, the controller 201 determines in step 303 if the source file has been pre-processed.

If it is determined in step 305 that the source file has been pre-processed, the controller 201 proceeds to step 309, and if it is determined in step 305 that the source file has not been pre-processed, the controller 201 proceeds to step 307.

The controller 201 can determine if a tokenized file corresponding to a current source file exists among tokenized files in the memory module 205, wherein if a tokenized file corresponding to the current source file exists, the controller 201 determines that the current source file has been pre-processed, and if a tokenized file corresponding to the current source file does not exist, the controller 201 determines that the current source file must be pre-processed.

In step 307, the controller 201 searches for the source file from the memory module 205, performs the line scanning process, and performs the tokenizing process.

Figure 5:
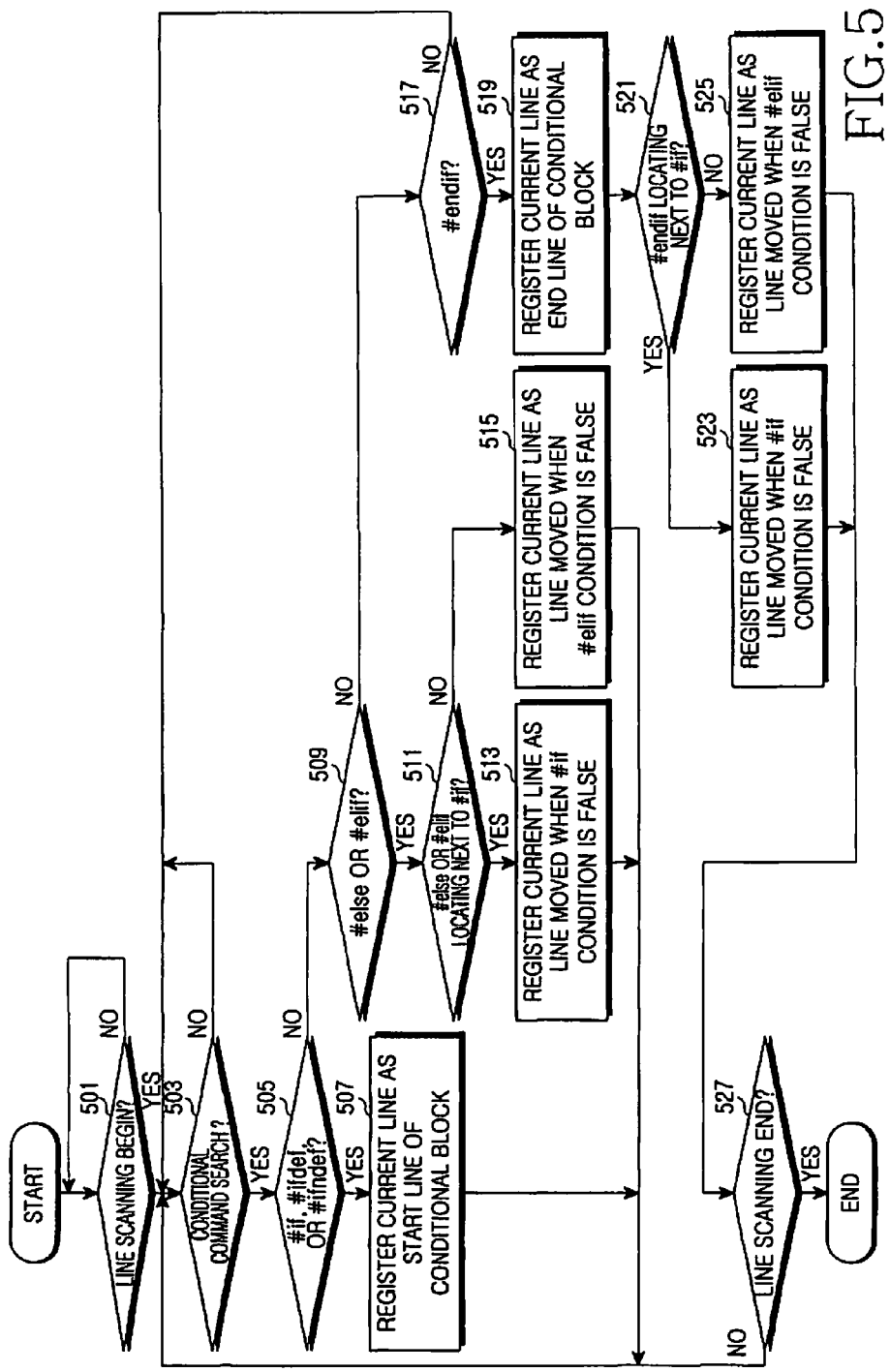
FIG. 5 is a flowchart illustrating a method of performing a line scanning process according to an exemplary embodiment of the present invention.

FIG. 5 is a flowchart illustrating a method of performing a line scanning process according to an exemplary embodiment of the present invention. The line scanning process will now be described in more detail with reference to FIGS. 2 and 5.

Since a conditional region can include another conditional region, it is assumed that a data structure uses a stack architecture. The stack architecture processes its commands in a Last-In-First-Out (LIFO) order, in which last input data is output first.

If the line scanning process begins in step 501, the controller 201 proceeds to step 503, and if the line scanning process does not begin in step 501, the controller 201 repeats step 501.

In step 503, the controller 201 analyzes codes included in an arbitrary file on a line-by-line basis and determines if a conditional command is contained in a current line. If it is determined in step 503 that a conditional command is contained in the current line, the controller 201 proceeds to step 505, and if it is determined in step 503 that no conditional command is contained in the current line, the controller 201 moves to a next line and repeats step 503.

If it is determined in step 505 that the conditional command contained in the current line is a #if syntax, a #ifdef syntax, or a #ifndef syntax, the controller 201 proceeds to step 507, and if it is determined in step 505 that the conditional command contained in the current line is not a #if syntax, a #ifdef syntax, or a #ifdef syntax, the controller 201 proceeds to step 509.

In step 507, the controller 201 stores the current line as 'ifLine', which is a start line of a conditional region, in the line information storage area 207 of the memory module 205 and proceeds to step 503.

If it is determined in step 509 that the conditional command contained in the current line is a #else syntax or a #elif syntax, the controller 201 proceeds to step 511, and if it is determined in step 509 that the conditional command contained in the current line is neither a #else syntax nor a #elif syntax, the controller 201 proceeds to step 517.

If it is determined in step 511 that the conditional command contained in the current line is a first #else syntax or a first #elif syntax in the conditional region, the controller 201 proceeds to step 513, and if it is determined in step 511 that the conditional command contained in the current line is neither a first #else syntax nor a first #elif syntax in the conditional region, the controller 201 proceeds to step 515.

In step 513, the controller 201 stores the current line as 'ifLine.falseTo', which is a line performed when a conditional expression accompanying the #if syntax is 'false', in the line information storage area 207 of the memory module 205 and proceeds to step 503.

In step 515, the controller 201 stores the current line as 'elseLine.falseTo', which is a line performed when a conditional expression accompanying the #elif syntax is 'false', in the line information storage area 207 of the memory module 205 and proceeds to step 503.

If it is determined in step 517 that the conditional command contained in the current line is a #endif syntax, the controller 201 proceeds to step 519, and if it is determined in step 517 that the conditional command contained in the current line is not a #endif syntax, the controller 201 proceeds to step 503.

In step 519, the controller 201 stores the current line as 'passTo', which is an end line of the conditional region, in the line information storage area 207 of the memory module 205.

If it is determined in step 521 that the #endif syntax contained in the current line is a conditional command existing immediately next to the #if syntax, the controller 201 proceeds to step 523, and if it is determined in step 521 that the #endif syntax contained in the current line does not exist immediately next to the #if syntax, the controller 201 proceeds to step 525.

In step 523, the controller 201 stores the current line as 'ifLine.falseTo', which is a line performed when a conditional expression accompanying the #if syntax is 'false', in the line information storage area 207 of the memory module 205.

In step 525, the controller 201 stores the current line as 'elseLine.falseTo', which is a line performed when a conditional expression accompanying the #elif syntax is 'false', in the line information storage area 207 of the memory module 205.

For example, when the conditional region consists of a #if syntax, a #elif syntax, and a #endif syntax, if a conditional expression accompanying the #if syntax is 'false' and a con- ditional expression accompanying the #endif syntax is 'false', the controller 201 can store the line of the #endif syntax as 'elseLine.falseTo'.

In step 527, the controller 201 determines if the line scanning process ends. If it is determined in step 527 that the line scanning process ends, the controller 201 generates a token list of the arbitrary file by performing the tokenizing process, and if it is determined in step 527 that the line scanning process does not end, the controller 201 proceeds to step 503.

By performing the line scanning process, the controller 201 can store line information of the conditional region included in the pre-processing region in the line information storage area 207 of the memory module 205.

FIG. 6 illustrates pseudo-codes obtained by editing a line scanning process in a programming language according to an exemplary embodiment of the present invention. The pseudo-codes used when editing a line scanning process in a programming language according to an exemplary embodiment of the present invention will now be described with reference to FIGS. 2 and 6.

The controller 201 analyzes codes contained in an arbitrary file on a line-by-line basis in line 601. The controller 201 determines in line 603 if a conditional command is contained in a current line. If it is determined that a conditional command is contained in the current line, the controller 201 determines in line 605 whether the conditional command contained in the current line is a #if syntax, a #ifdef syntax, or a #ifndef syntax. If it is determined that the conditional command contained in the current line is a #if syntax, a #ifdef syntax, or a #ifndef syntax, the controller 201 designates the line information storage area 207 for storing line information to the memory module 205 in line 607. The controller 201 stores the current line as 'ifLine', which is a start line of a conditional region, in the line information storage area 207 of the memory module 205 in a line 609.

The controller 201 determines in line 611 if line information is stored in the line information storage area 207 of the memory module 205. If it is determined that no line information is stored in the line information storage area 207 of the memory module 205, the controller 201 determines in line 613 whether the conditional command contained in the current line is a #else syntax or a #elif syntax. If it is determined that the conditional command contained in the current line is a #else syntax or a #elif syntax, the controller 201 determines in line 615 whether 'elseLine' is stored in the line information storage area 207 of the memory module 205. That is, the controller 201 determines in line 615 whether the #else syntax or the #elif syntax is a first else syntax or a first #elif syntax in the conditional region. If it is determined that 'elseLine' is not stored in the line information storage area 207 of the memory module 205, the controller 201 stores the current line as 'ifLine.falseTo', which is a line performed when a state of a conditional expression accompanying a previous conditional command is 'false', in the line information storage area 207 of the memory module 205 in line 617. If it is determined that 'elseLine' is stored in the line information storage area 207 of the memory module 205, the controller 201 stores the current line as 'elseLine.falseTo', which is a line performed when a conditional expression accompanying a previous conditional command, i.e., the #elif syntax, is 'false', in the line information storage area 207 of the memory module 205 in line 619. The controller 201 stores the current line as 'elseLine', which indicates a line containing the #else syntax or the #elif syntax, in the line information storage area 207 of the memory module 205 in line 621.

The controller 201 determines in line 623 if the conditional command contained in the current line is a #endif syntax. If it is determined that the conditional command contained in the current line is a #endif syntax, the controller 201 stores the current line as 'passTo', which indicates an end line of the conditional region, in the line information storage area 207 of the memory module 205 in line 625. The controller 201 determines in line 627 if 'elseLine' is stored in the line information storage area 207 of the memory module 205. If it is determined that 'elseLine' is not stored in the line information storage area 207 of the memory module 205, the controller 201 stores the current line as 'ifLine.falseTo' in the line information storage area 207 of the memory module 205 in line 629. If it is determined that 'elseLine' is stored in the line information storage area 207 of the memory module 205, the controller 201 stores the current line as 'elseLine.falseTo' in the line information storage area 207 of the memory module 205 in line 631. The controller 201 searches for a line immediately next to the current line from the arbitrary file in line 633 and proceeds to line 601.

Referring back to FIG. 3, the controller 201 searches for a token list of the source file in step 309. The controller 201 receives a character stream of the source file according to the found token list, performs the token processing, and ends the pre-processing.

Figure 7:
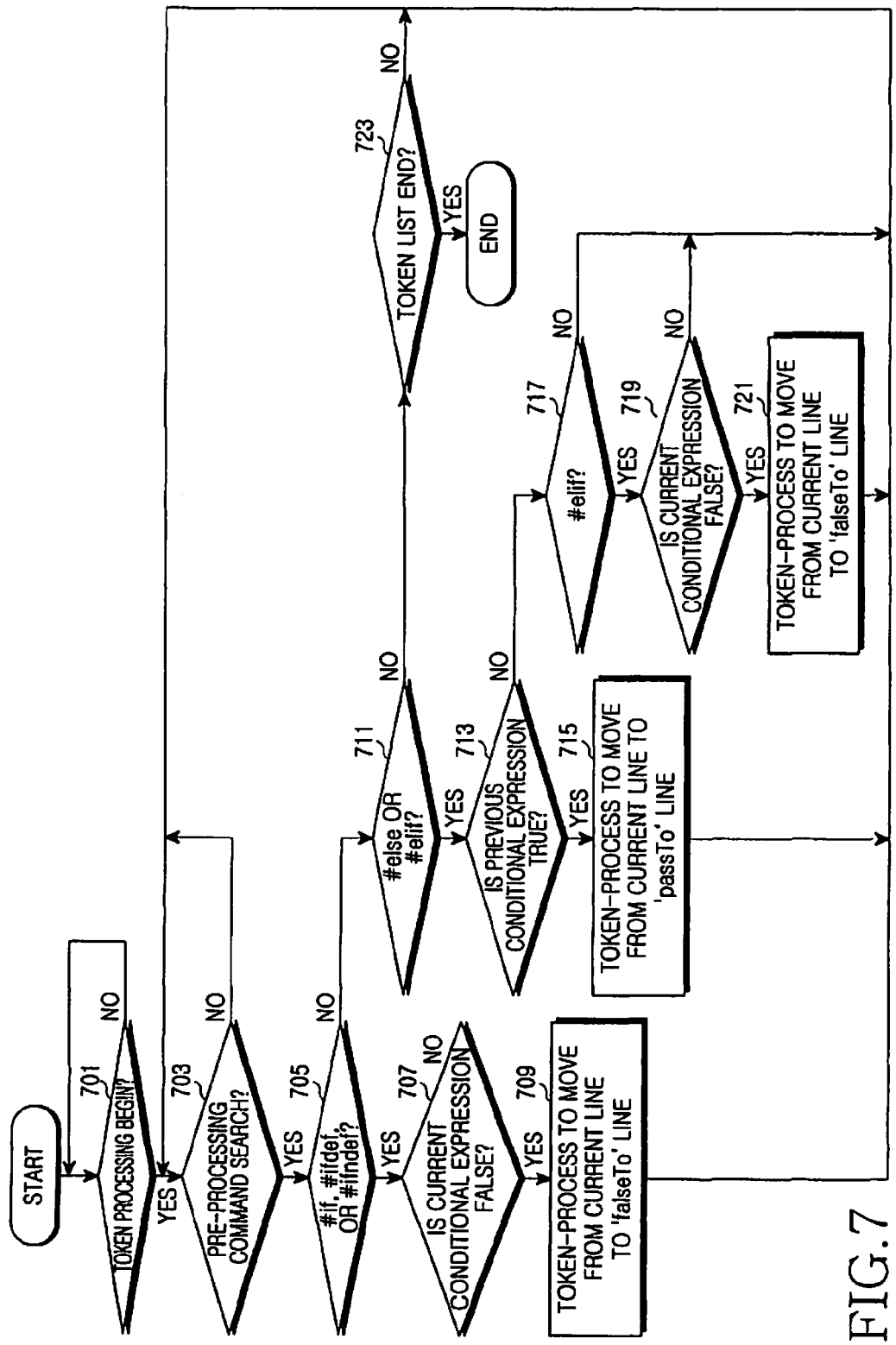
FIG. 7 is a flowchart illustrating a method of performing a token processing process according to an exemplary embodiment of the present invention.

FIG. 7 is a flowchart illustrating a method of performing a token processing according to an exemplary embodiment of the present invention. The token processing process will now be described in more detail with reference to FIGS. 2 and 7.

If the token processing process begins in step 701, the controller 201 proceeds to step 703, and if the token processing process does not begin in step 701, the controller 201 repeats step 701.

In step 703, the controller 201 analyzes codes of an arbitrary file according to a token list and determines if a current code corresponds to a conditional command. If it is determined in step 703 that the current code corresponds to a conditional command, the controller 201 proceeds to step 705, and if it is determined in step 703 that the current code does not correspond to a conditional command, the controller 201 receives and analyzes a subsequent code.

The controller 201 determines in step 705 whether the current code corresponds to a #if syntax, a #ifdef syntax, or a #ifndef syntax, which is a conditional command. If it is determined in step 705 that the current code corresponds to a #if syntax, a #ifdef syntax, or a #ifndef syntax, the controller 201 proceeds to step 707, and if it is determined in step 705 that the current code does not correspond to a #if syntax, a #ifdef syntax, or a #ifndef syntax, the controller 201 proceeds to step 711.

The controller 201 determines in step 707 whether a conditional expression accompanying the #if syntax, the #ifdef syntax, or the #ifndef syntax is 'true' or 'false'. If it is determined in step 707 that the conditional expression is 'false', the controller 201 proceeds to step 709, and if it is determined in step 707 that the conditional expression is 'true', the controller 201 proceeds to step 703.

The controller 201 searches for a line stored as 'ifLine.falseTo' from the line information storage area 207 of the memory module 205 in step 709. The controller 201 receives a code contained in the found 'ifLine.falseTo' line according to the token list and proceeds to step 703.

The controller 201 determines in step 711 whether a character stream contained in the conditional command corresponds to a #else syntax or a #elif syntax. If it is determined in step 711 that the character stream corresponds to a #else syntax or a #elif syntax, the controller 201 proceeds to step 713, and if it is determined in step 711 that the character stream corresponds to neither a #else syntax nor a #elif syntax, the controller 201 proceeds to step 723.

The controller 201 determines in step 713 whether the conditional expression found in step 709 is 'true' or 'false'. If it is determined in step 713 that the conditional expression is 'true', the controller 201 proceeds to step 715, and if it is determined in step 713 that the conditional expression is 'false', the controller 201 proceeds to step 717.

The controller 201 searches for a line stored as 'passTo' from the line information storage area 207 of the memory module 205 in step 715. The controller 201 receives a code contained in the found 'passTo' line according to the token list and proceeds to step 703.

The controller 201 determines in step 717 whether the conditional command corresponds to the #elif syntax. If it is determined in step 717 that the conditional command corresponds to the #elif syntax, the controller 201 proceeds to step 719, and if it is determined in step 717 that the conditional command does not correspond to the #elif syntax, the controller 201 proceeds to step 703.

The controller 201 determines in step 719 whether a conditional expression accompanying the #elif syntax is 'true' or 'false'. If it is determined in step 719 that the conditional expression is 'false', the controller 201 proceeds to step 721, and if it is determined in step 719 that the conditional expression is 'true', the controller 201 proceeds to step 703.

The controller 201 searches for a line registered as 'elseLine.falseTo' in step 721. The controller 201 receives a code contained in the found 'elseLine.falseTo' line according to the token list and proceeds to step 703.

The controller 201 determines in step 723 whether the conditional command corresponds to the #endif syntax. If it is determined in step 723 that the token processing does not end, the controller 201 proceeds to step 703, and if it is determined in step 723 that the token processing ends, the controller 201 ends the token processing of the conditional region included in the arbitrary file.

FIG. 8 illustrates pseudo-codes obtained by editing a token processing in a programming language according to an exemplary embodiment of the present invention. The pseudo-codes used when editing a token processing in a programming language according to an exemplary embodiment of the present invention will now be described with reference to FIGS. 2 and 7.

The controller 201 receives a code of an arbitrary tokenized file according to a token list in a line 801. The controller 201 determines in line 803 whether a current code is a conditional command.

The controller 201 determines in line 805 whether the conditional command contained in the current tokenized line is a #if syntax, a #ifdef syntax, or a #ifndef syntax. If it is determined that the current conditional command is a #if syntax, a #ifdef syntax, or a #ifndef syntax, the controller 201 stores a state of a conditional expression accompanying the current conditional command in line 807. The controller 201 searches for a 'passTo' line of the conditional region and stores the found 'passTo' line in a stack in a line 809.

The controller 201 determines in line 811 whether the conditional expression accompanying the current conditional command is 'true' or 'false'. If it is determined that the conditional expression is 'false', the controller 201 searches for a code contained in a pre-stored 'ifLine.falseTo' line from the token list and receives the found code in line 813.

The controller 201 determines in line 815 if the current conditional command is a #endif syntax. If it is determined that the current conditional command is the #endif syntax, the controller 201 initializes the stack of the memory module 205 in line 817.

The controller 201 determines in line 819 whether the current conditional command is a #else syntax or a #elif syntax.

The controller 201 determines in line 821 whether a conditional expression accompanying a previous conditional command is 'true' or 'false'. If it is determined that the previous conditional expression is 'true', the controller 201 searches for a code contained in a 'passTo' line pre-stored in the memory 205 from the token list and receives the found code in line 823. If it is determined that the previous conditional expression is 'false', the controller 201 determines in line 825 if the conditional command contained in the current line is a #elif syntax. If it is determined that the conditional command is the #elif syntax, the controller 201 stores a state of a conditional expression accompanying the current conditional command, i.e., the #elif syntax, in the stack of the memory module 205 in line 827. The controller 201 determines in line 829 whether the conditional expression accompanying the #elif syntax is 'true' or 'false'. If it is determined that the conditional expression is 'false', the controller 201 searches for a code contained in a 'elseLine.falseTo' line pre-stored in the memory 205 from the token list and receives the found code in line 831.

The controller 201 determines in line 833 that the conditional command contained in the current tokenized line is the #else syntax. The controller 201 stores the state of the previous conditional expression as 'true' in line 835.

If no conditional command is contained in the current tokenized line, the controller 201 determines in line 837 that the current line is not included in the conditional region.

At line 839, the controller 201 repeatedly analyzes, checks the lines 801 to 837 until all lines included in the arbitrary file are analyzed and ends the pre-processing of the arbitrary file.

The pre-processing according to an exemplary embodiment of the present invention will now be described with reference to FIG. 9. Line information is searched for in the line scanning process and stored in the memory module 205. That is, the controller 201 stores the line 903 as 'ifLine', the line 907 as 'ifLine.falseTo', and the line 911 as 'passTo' in the memory module 205. The controller 201 performs the token processing by tokenizing an arbitrary file and searching the tokenized arbitrary file line by line. That is, since a conditional expression accompanying the current #if syntax is 'true', the controller 201 can compile the arbitrary file so as to insert the lines 901 to 907 into a token list and skip the line 909 and move to the line 911 in the token list.

As described above, according to the present invention, when an arbitrary file is compiled, pre-processing can be efficiently performed during the compiling, and when an arbitrary compiled file created according to the present invention is executed, an execution result can be derived in a short time.

While the invention has been shown and described with reference to a certain preferred embodiments thereof, it will be understood by those skilled in the art that various changes in form and details may be made therein without departing from the spirit and scope of the invention. For example, in the embodiments of the present invention, although the token processing is performed after the tokenizing process is performed, the token processing may be performed together with the tokenizing process. Thus, it will be understood by those skilled in the art that various changes in form and details may be made therein without departing from the spirit and scope of the invention as defined by the appended claims.

What is claimed is:

1. A method of pre-processing a conditional region, the method comprising:
   when compiling is requested, analyzing codes included in an arbitrary file, searching a conditional region in a pre-processing region, and designating and storing line information according to a conditional command included in the conditional region;
   generating a token list by tokenizing the codes and storing the generated token list;
   sequentially detecting an arbitrary code from the token list for compiling;
   determining if the detected code is a conditional command;
   when it is determined that the detected code is a conditional command, identifying line information for the detected code among the stored line information according to a conditional state of a conditional expression accompanying a previous conditional command and a conditional state of a conditional expression accompanying the conditional command, and detecting a next relevant code from the token list for compiling according to the line information;
   when it is determined that the detected code is not a conditional command, detecting the next relevant code from the token list for compiling in a sequential manner; and
   repeating the determining, identifying and detecting steps such that the arbitrary file is compiled having only those codes of the conditional region that are to be executed.

2. The method of claim 1, wherein the searching, designating and storing steps comprise:
   searching for and analyzing the codes included in the arbitrary file on a line-by-line basis;
   if it is determined according to the analysis result that a current line contains a conditional command, generating line information containing a position of the current line according to the conditional command; and
   storing the line information.

3. The method of claim 1, wherein the line information is generated according to a type of the pre-processing command and a conditional state of the conditional expression accompanying the pre-processing command.

* * * * *